Jan. 13, 1959 J. W. BUTTERWORTH 2,869,116
AUTOMATIC KEYER FOR LIFEBOAT RADIO EQUIPMENT
Filed Jan. 28, 1954 6 Sheets-Sheet 1

INVENTOR.
JOHN W. BUTTERWORTH
BY
Robert Harding Jr.
ATTORNEY.

Jan. 13, 1959 J. W. BUTTERWORTH 2,869,116

AUTOMATIC KEYER FOR LIFEBOAT RADIO EQUIPMENT

Filed Jan. 28, 1954 6 Sheets-Sheet 2

INVENTOR.
JOHN W. BUTTERWORTH
BY
Robert Harding Jr.
ATTORNEY.

Jan. 13, 1959 J. W. BUTTERWORTH 2,869,116

AUTOMATIC KEYER FOR LIFEBOAT RADIO EQUIPMENT

Filed Jan. 28, 1954 6 Sheets-Sheet 3

INVENTOR
JOHN W. BUTTERWORTH
BY Robert Harding Jr.
ATTORNEY

Jan. 13, 1959 J. W. BUTTERWORTH 2,869,116

AUTOMATIC KEYER FOR LIFEBOAT RADIO EQUIPMENT

Filed Jan. 28, 1954

6 Sheets-Sheet 4

INVENTOR
JOHN W. BUTTERWORTH
BY Robert Harding Jr.
ATTORNEY

Jan. 13, 1959 J. W. BUTTERWORTH 2,869,116

AUTOMATIC KEYER FOR LIFEBOAT RADIO EQUIPMENT

Filed Jan. 28, 1954 6 Sheets-Sheet 5

INVENTOR
JOHN W. BUTTERWORTH
BY
Robert Harding Jr.
ATTORNEY

INVENTOR
JOHN W. BUTTERWORTH
BY Robert Harding Jr.
ATTORNEY

United States Patent Office 2,869,116

Patented Jan. 13, 1959

2,869,116

AUTOMATIC KEYER FOR LIFEBOAT RADIO EQUIPMENT

John William Butterworth, Paterson, N. J., assignor to Mackay Radio and Telegraph Company, New York, N. Y., a corporation of Delaware Application January 28, 1954, Serial No. 406,765

20 Claims. (Cl. 340—356)

This invention relates to radio keyers and more particularly it relates to arrangements for automatically keying a radio transmitter to send out cyclically recurrent special coded signals, such for example as distress signals and alarm signals.

As prescribed by International Convention relevant to lifeboat radio equipment, the equipment must be capable of transmitting signals coded to represent an alarm which alarm consists of dashes each of four seconds duration and spaced one second apart. The alarm signal is to be transmitted for a period of one minute and is to be followed by the cyclically repeated International Morse Code distress or "SOS" signal. Also, according to International Convention, the coded alarm signal is first to be transmitted and then the "SOS" signal is to be transmitted on a radio frequency carrier, for example 500 kilocycles per second, and thereafter the "SOS" signal is to be transmitted on radio frequency carrier of 8364 kilocycles per second. After the "SOS" signal a continuous dash of at least 30 second duration is transmitted at the higher frequency. The complete cycle of transmitting the repeated alarm signal dashes for one minute, the separate "SOS" signals and the continuous thirty-second dash should require a total duration of approximately 120 seconds.

The present invention has for one of its main objects to provide a novel organization of apparatus which fulfills the requirements of the International Convention.

Heretofore, automatic keying apparatus of this general kind has been manufactured, but it required generally a very complex combination of mechanically shiftable switches, switch operating cams, and special mechanical and electrical interconnections with the associated radio transmitter equipment.

Accordingly, another principal object of the invention is to provide an automatic distress keying mechanism for radio transmitters and the like, which mechanism is characterized by simplicity and reliability of operation over long periods of time.

A feature of the invention relates to an automatic keyer employing a rotatable keying control wheel with its coded keying contacts arranged in concentric arrays in conjunction with a novel switching device which serves to selectively switch from one carrier generator to another and to control application of the coded signals from said keying control wheels all in timed relation with the rotation of said wheel.

Another feature of the invention relates to an automatic keyer employing a rotatable keying control wheel with its coded keying contact arranged in multi-turn spiral array, in conjunction with a simplified switching device which automatically scans the spiral wheel to provide a selective switching from one carrier generator to another in timed interlock with successive stages of such scanning.

A further feature relates to an automatic keyer employing a rotatable keying control wheel with coded keying contacts arranged in successive repeated groups in a multi-turn spiral array in conjunction with a pair of shiftable contacts which are cyclically operated by a member rotating in fixed speed relation to the keying wheel whereby the proper carrier generator is connected in circuit for each section of the keyed code as it is being repeated.

Another feature relates to a novel switching control mechanism for automatically connecting each of a pair of carrier generators in circuit with a corresponding section of a rotatable keying disc.

A still further feature relates to the novel organization, arrangement and relative interconnection of parts which cooperate to provide an improved automatic distress keying system. Other features and advantages will appear from the ensuing descriptions and the appended claims and as illustrated in the accompanying drawings, wherein, Fig. 1 is a composite schematic wiring diagram of an automatic keying system according to the invention.

Figures 1, 2, 2A, 3, 4:
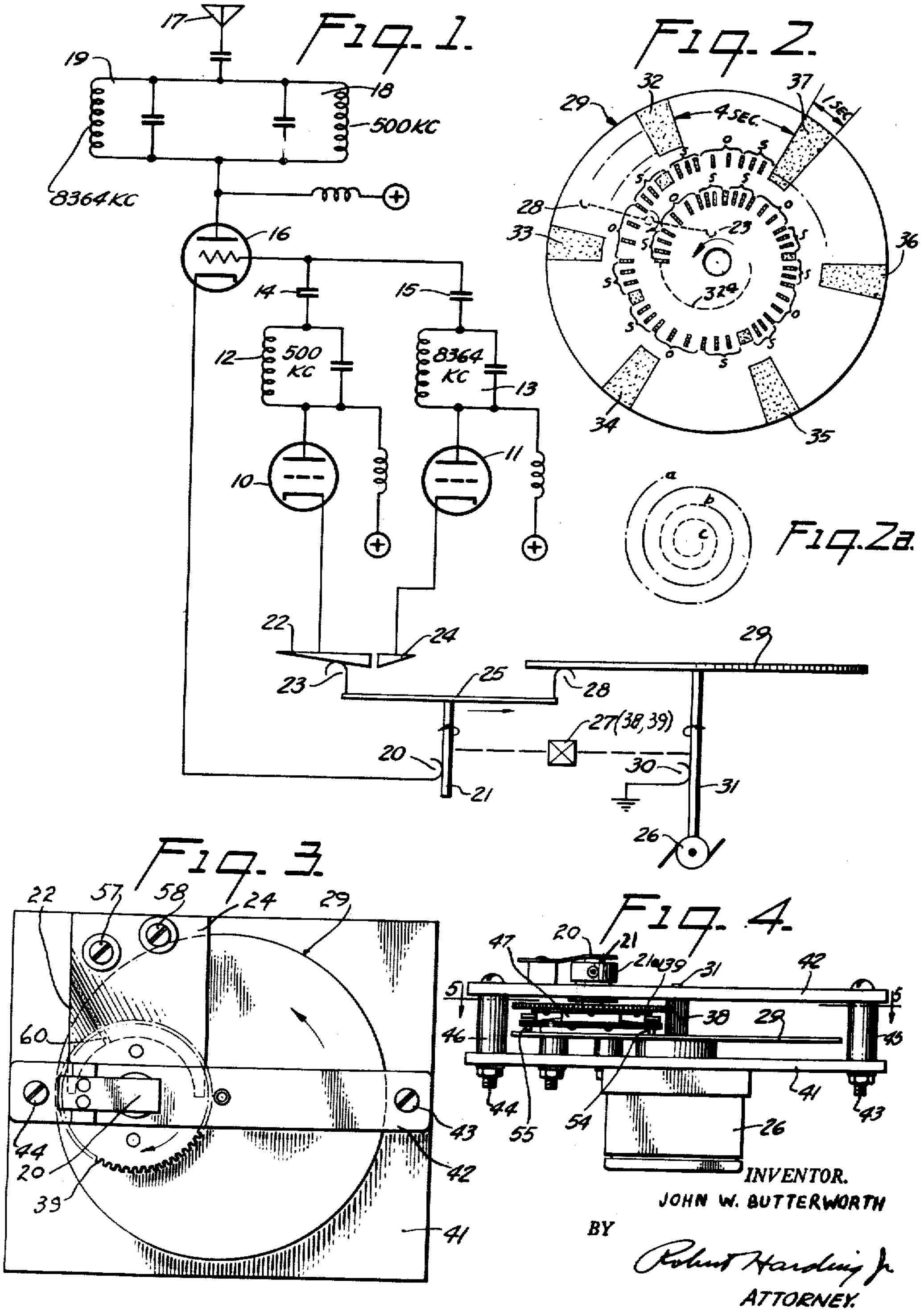
Fig. 2 is a detailed front face view of the rotatable keying wheel of Fig. 1.
Fig. 2A is a diagrammatic view explanatory of Fig. 2.
Fig. 3 is a top-plan view of the mechanism for controlling the shifting of the connections to the carrier generators of Fig. 1 in timed interlock with the keying wheel of Fig. 2.
Fig. 4 is a side elevational view of Fig. 3.
Figure 5:
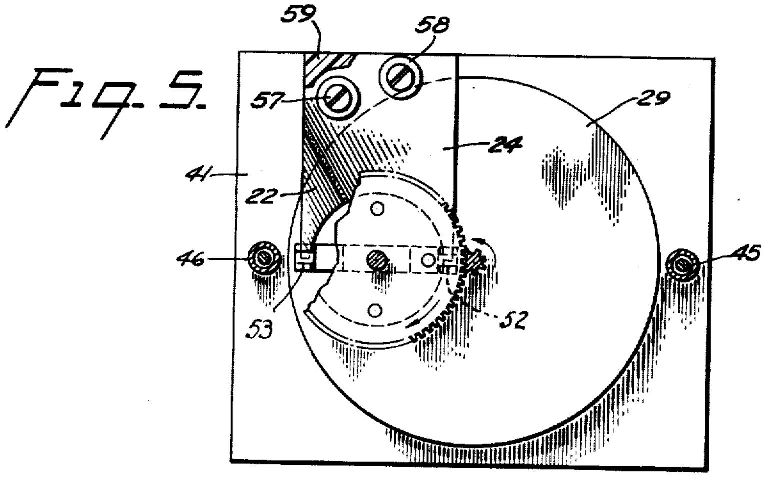
Fig. 5 is a sectional view of Fig. 4, taken along the line 5—5 thereof.

Referring to Fig. 1 of the drawing, the numeral 10 represents any well-known electron tube oscillator for generating a carrier frequency of, for example, 500 kilocycles per second. The numeral 11 represents another similar electron tube oscillator for generating a carrier of, for example, 8364 kilocycles per second. In the conventional manner, the plate circuit of each of the tubes 10 and 11 is connected through a respective tuned tank circuit 12, 13, and coupled through respective condensers 14, 15, to the control grid of an amplifier tube 16. The output of tube 16 is connected to the transmitting antenna 17 through respective 500 kilocycle tuned tank circuit 18 and 8364 kilocycle tuned tank circuit 19. The cathode return circuit of the amplifier tube 16 is completed to ground through a brush 20 which rubs on the shaft 21 of the switching control mechanism to be described hereinbelow, and thence to ground through brush 30.

Likewise, the cathode return circuit of tube 10 is completed through a fixedly mounted contact plate 22 which is connected to the grounded shaft 21 at the appropriate instant by means of a selectively shiftable brush 23. The brush 23 is arranged to be moved from the contact plate 22 on to another contact plate 24 so as to open the cathode return circuit of tube 10, and to close the cathode return circuit of tube 11 at the appropriate times to be described hereinbelow. The brush 23 is attached to a flexible metal arm 25 which is arranged to be rotated at the required rate of speed from a suitable driving motor 26 through reduction gearing 27. The arm 25 also carries another brush 28 similar to brush 23. The brushes 23 and 28, in addition to riding over the stationary contact plates 22 and 24 in succession during the rotation are also arranged successively to engage the contact elements on a rotary keying wheel 29 which is driven directly from the motor 26. The brush 30 engages the shaft 31 to provide a ground return circuit for the tubes 10, 11 and 16. In accordance with the invention, the gearing 27 is such as to rotate the shaft 31 at eight times the speed of shaft 21.

The wheel 29, which is shown in face view in Fig. 2, comprises laminated metal and Bakelite discs. The metal discs are cut away or etched to provide a series of six radially extending insulator portions 32, 33, 34, 35, 36, 37 adjacent the periphery of the wheel. The insulator portions 32—36 are of the same radial length, but the portion 37 is of slightly longer radial length. The metal surface of the laminated wheel is also etched or cut away to provide a series of insulator segments with the intervening portions of the metal disc constituting respective contact segments. This etching or cutting away of the contacts is effected so as to form a code corresponding to the International Morse "SOS" signal consisting of three dots for the letter "S" and three dashes for the letter "O." These "SOS" coded segments are arranged in a spiral array, as shown in Fig. 2 and begin at a point adjacent the insulator section 37, and thence in a spiral array so that the "SOS" signal is automatically keyed into circuit six times between each recurrent series of alarm signals. The alarm signals are controlled or keyed on by the sections of the metal disc located between the insulator portions 32—37.

In order to conform with the International Convention, each of the alarm sections of the metal disc and the rate of rotation of the disc is such that each alarm dash is keyed on for four seconds and is keyed off by means of the respective insulator portion 32—37 for a period of one second between dashes. In accordance with the invention, alternate of the brushes 23 and 28 are arranged to make time-interlocked contact with the alarm four-second-contact-portions of the wheel 29 and the respective and proper one of the contact plates 22 and 24. For this purpose, the shaft 21 is mounted in offset relation with relation to the shaft 31 so that as a result of the step-down gear ratio 27, the brushes 23 and 28, successively rub on or scan the wheel 29 in a substantially radial direction. Thus, when the wheel 29 and arm 25 are rotating, as represented by the arrows, the brush 28 for example, may be at the position schematically shown in Fig. 2 where it can successively engage the four-second alarm contact sectors.

Each brush 23, 28 therefore, when it is in contact with wheel 29, describes on the surface thereof a four-convolution spiral trace. Wheel 29 is rotated at the rate of one revolution per thirty seconds so that during the first two convolutions of the spiral trace, the brush 23, or the brush 28 as the case may be, engages only the alarm contact segments, as represented schematically in Fig. 2A by the dot-dash line *a*—*b* portion of the trace. During the next revolution of wheel 29, the brush 23 or 28 as the case may be, engages the "SOS" contact segments as represented by the dotted line portion *b*—*c* of the trace. At the end of each group of transmitted "SOS" signals, the brush 23 or 28 rides on the conductive surface of wheel 29, indicated by the arc 32*a* (Fig. 2) for approximately one complete revolution, thus transmitting a continuous thirty-second dash. This completes the cycle of transmission which requires approximately 120 seconds, and the cycle of course, is repeated as long as the wheel 29 rotates.

While the brush 28 for example, is tracing or scanning the alarm portion of the spiral path, that is between points *a* and *b* (Fig. 2A), the other brush 23 is in contact with the fixed contact plate 22 thereby being prevented from engaging wheel 29. After wheel 29 has made four revolutions, shaft 21 will have rotated 180° thereupon allowing the brush 23 to come into contact with wheel 29 while at the same time brush 28 makes contact with plate 24 and thereby disengages from contact with the surface of wheel 29.

Figures 6, 7, 8, 9:
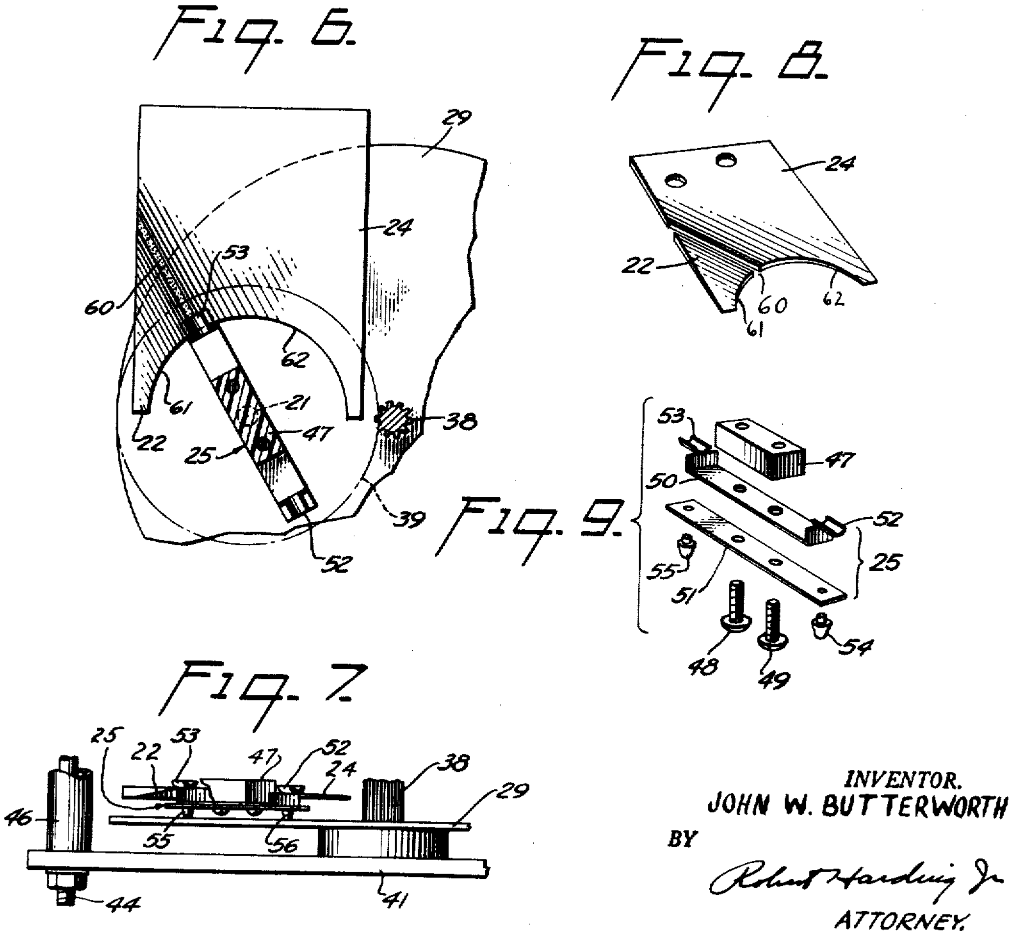
Fig. 6 is an enlarged view of part of Fig. 5.
Fig. 7 is an enlarged top-plan view of part of Fig. 4, showing the rotatable switching control element in a different setting with respect to the keying wheel.
Fig. 8 is an enlarged perspective view of the dual contact control plate shown in Figs. 2 to 7.
Fig. 9 is an exploded perspective view of the rotatable contact member of Figs. 2 to 7.

As shown in the structural views of Figs. 3 to 9, the shaft 31 carries a pinion gear 38 meshing with a gear 39 fastened to shaft 21. Shafts 21 and 31 are rotatably supported between a lower plate 41 and an upper bearing plate 42 both plates being held in spaced relation by screws 43, 44, and spacer sleeves 45, 46. Shaft 21 is electrically insulated from bearing plate 42 by means of insulating bushing 21*a*, made of a suitable insulating material. Fastened to shaft 21 is a block 47 (Fig. 9) of insulating material which block has fastened thereto by screws 48, 49, the flexible spring arm 25 consisting of two integrally fastened flat spring strips 50, 51. The strip 50 has at opposite ends a pair of struck-out curved contact lugs 52, 53, which are offset or spaced from the other strip 51 by means of the right-angled bent ends of member 50. Member 51 carries at its opposite ends contact points 54, 55. Thus, elements 52, 54, correspond functionally to the brush 28 shown schematically in Fig. 1, and the elements 53, 55, correspond functionally to the brush 23 of Fig. 1. As shown in Figs. 4 and 7, block 47 and its attached spring contact arm 25 is mounted so that the contact points 54, 55 respectively tend to rub on the coded contact face of wheel 29 when the arm 25 is rotated through each successive 180°.

For the purpose of moving each contact point 54, 55, away from contact with the wheel 29 during the proper intervals, there is supported from the plate 42 by screws 57, 58, an insulator plate 59, which has attached to one face thereof the inclined metal flat contact plates 22, 24, which are spaced apart to define the gap 60. Each of the contact plates 22, 24, has a circular curved inner edge 61, 62, which together define a circular arc whose radius of curvature is somewhat less than one-half the length of the spring contact arm 25. Plate 59 with its contact plates 22, 24 is mounted so that the center of curvature of the circular edges 61, 62, is located on the axis of rotation of shaft 21, and the lugs 52, 53, can ride on the marginal portions of contact plates 22, 24.

As shown more clearly in Fig. 8, the contact plates 22 and 24 are of inclined or tapered cross-section so that as the lug 53, for example engages and rides on plate 22, it acts as a lifting cam to cause the associated contact point 55 to be forced away from contact with wheel 29; but at this time the opposite lug 52 is not riding on plate 24 so that its associated contact point 54 remains in engagement with wheel 29. On the other hand, when the arm 25 has rotated through 180°, the contact lug 52 engages the plate 22 whereby contact point 54 is held out of engagement with the wheel 29 while the opposite contact point 55 is in contact with the wheel 29. The net result is that while one brush, for example brush 28 (Fig. 1) is scanning the alarm contacts on the wheel, the other brush 23 is completing the return circuit of tube 10. On the other hand when the brush 28 is scanning the "SOS" contact portion of wheel 29, the brush 23 is in engagement with contact plate 24 to complete the cathode return circuit of tube 11. On the next 180° of rotation of the arm 25, the brush 23 scans the wheel 29 while the brush 28 at the proper intervals makes contact successively with plates 22 and 24. Thus, the proper carrier frequencies are respectively transmitted for the alarm signals and for the "SOS" signals.

A modified form of my invention is shown in Figs. 10 to 15, and differs from the first embodiment described in that the brush wipers are stationary. In Figs. 10 to 14, similar elements are given the same reference numerals as those in Figs. 1 thru 9.

Figure 10:
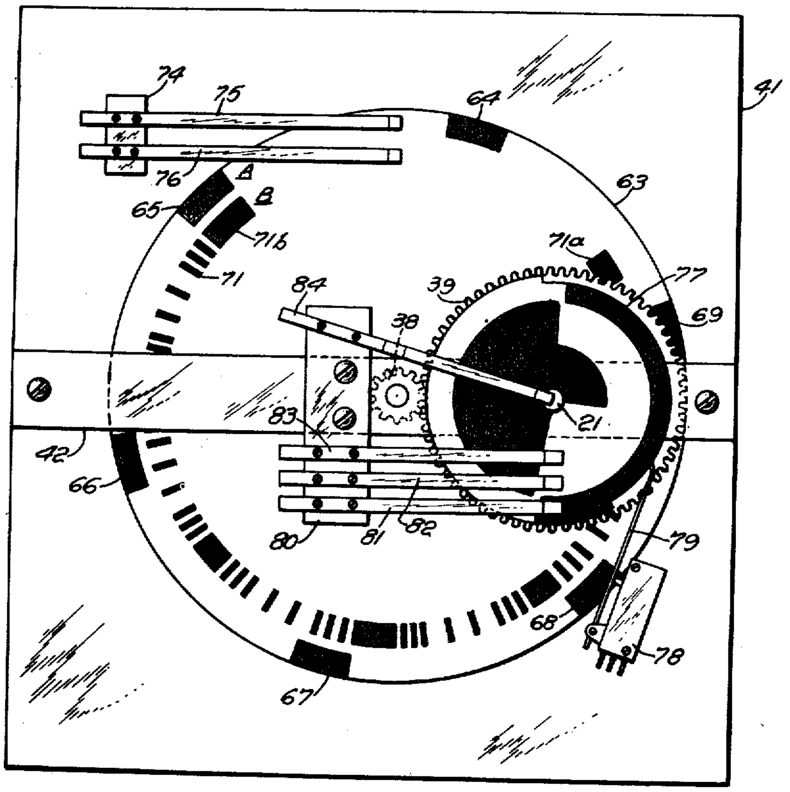
Fig. 10 is a top-plan view of a modified form of my invention.
Figure 13:
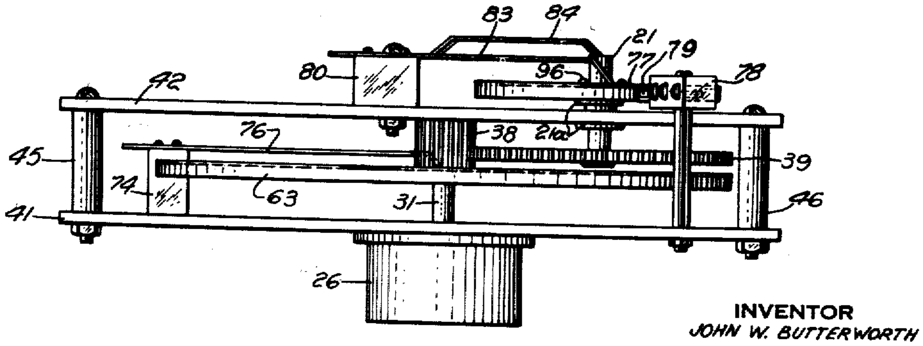
Fig. 13 is a side elevational view of the structure of Fig. 10.
Figure 11:
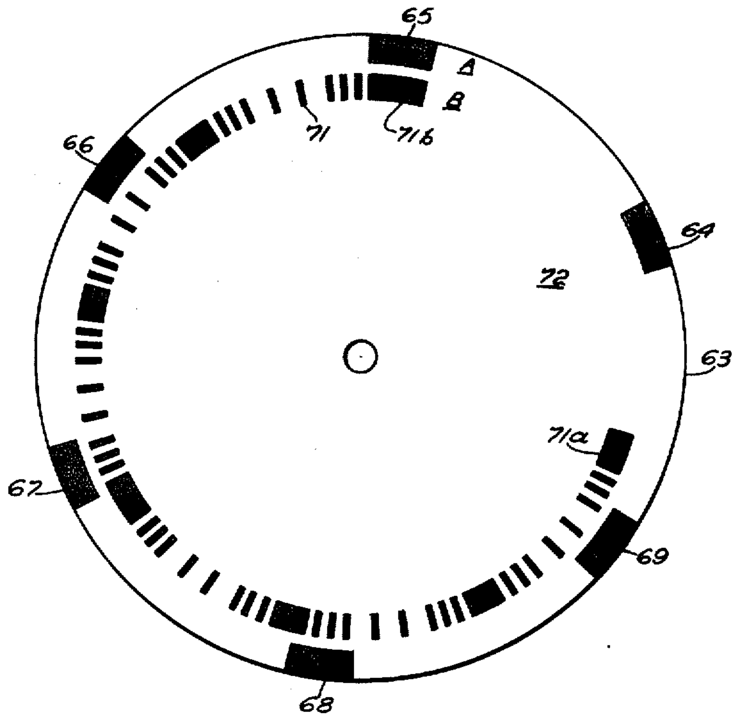
Fig. 11 is a detailed front face view of the rotatable keying wheel used in the modified structure.

Referring now to Fig. 11, the modified keying code wheel 63 is provided with six, equidistantly spaced, radially extending insulator portions 64, 65, 66, 67, 68, 69 of like size and cut away or etched into the metallic surface of wheel 63 adjacent the periphery thereof. The six insulator portions and the metal separating them thus constitute a first annular track A. Concentric with, but spaced radially inwardly from the peripheral portion of the wheel 63, I provide a circular row of contact segments 71 etched so as to form six complete "SOS" code distress signals, all suitably spaced. The segments 71 do not form a complete circle and the intervening space 72 between the last code segment **71*a* and the first code segment 71*b* is adapted to control the commencement of the sending of the long dash at the conclusion of the third revolution of wheel 63 as described in connection with the first embodiment. The circular row of segments 71 constitute a second annular track B; the tracks A and B being concentric. Referring now to Fig. 10, I provide an insulating block 74 affixed to lower plate 41 and a pair of spaced parallel contact wipers 75 and 76, each having one end fastened to said block. The wipers 75, 76, are arranged to extend over the surface of wheel 63 to a point between the center and the periphery thereof on a line substantially, but not necessarily, perpendicular to a radius of said wheel. Wiper 75 is adapted to cooperate with the annular track A and wiper 76** is adapted to cooperate with the annular track B.

A rotatable cam wheel 77 is provided as shown in detail in Figs. 12 and 12A, and whose function will be later described in detail. As in the case of the first embodiment, I provide a rotatable shaft 21 which is fixedly attached to gear 39. The gear 39 is preferably of electrically non-conducting material. The shaft 21 is provided with an electrically insulating bushing **21*a* to electrically isolate the shaft 21 from the upper bearing plate 42 through which it extends. Fixedly mounted on the portion of shaft 21 which extends above the plate 42, there is provided a metal ferrule 21*b* over which is concentrically mounted cam wheel 77, the wheel being attached to the ferrule by means of screws 96**.

An identical driving arrangement similar to that shown in Figs. 3 and 4 is utilized, the shaft 21 being rotated by motor 26 through the cooperation of pinion gear 38 and cooperating gear 39. Mounted on plate 41 tangential to the cam wheel 77, I provide a single pole, double-throw switch 78, said switch having an actuating arm 79 in rubbing contact with the peripheral edge of wheel 77. Mounted on upper bearing plate 42, I provide another insulating block 80, to which is attached one end respectively of each of a group of three spaced, parallel additional contact wipers 81, 82 and 83, each arranged to extend over the surface of cam wheel 77 to a point between the center and the periphery thereof on a line substantially, but not necessarily, perpendicular to a radius of said cam wheel. A separate additional contact wiper 84 is also connected to block 80 and makes continuous electrical contact with shaft 21, in similar fashion to contact 20 shown in Figs. 3 and 4. Code wheel 63 is adapted to be driven in a clockwise direction by driving motor 26 and cam wheel 77 is adapted to be driven in a counter-clockwise direction by co-action of gears 38 and 39 as is more clearly shown in Fig. 13.

Figure 12:
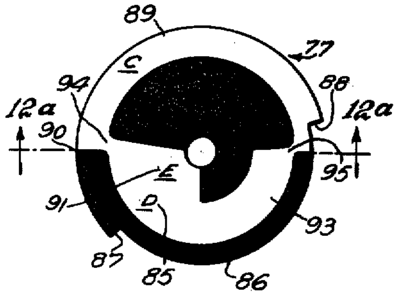
Fig. 12 is a detailed front face view of the cam wheel used in the modified structure.
Figure 12A:
Fig. 12A is a side view of the cam wheel shown in Fig. 12.
Figure 14:
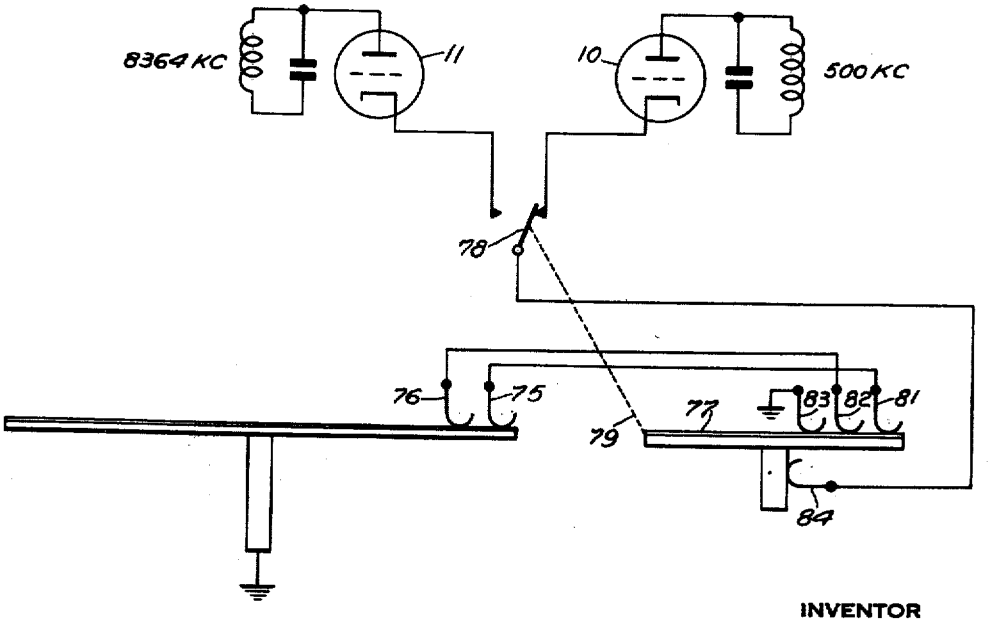
Fig. 14 is a composite schematic wiring diagram of the control portion of the modified form of my invention.

Referring now to Fig. 12, a detailed explanation of the cam wheel 77 will now be given. Wheel 77 is made up of a base portion 84 of insulating material and metallic portion 85 affixed to the upper surface of portion 84 by any suitable means. The configuration of the base portion 84 is such as to provide a smaller radius for that portion 86 of the circumference of the wheel which lies between points 87 and 88. The configuration of the metallic portion 85 is irregular and comprises a first arcuate outer portion 89 adjacent the periphery of portion 84 opposite portion 86, and commencing at point 88 and terminating at point 90, the point 90 being separated from point 87 by substantially 45 degrees. The metallic portion 85 is also provided with a second arcuate inner portion 91, spaced radially inward from the periphery of base portion 84 and extending radially inward to the center hole 92 which extends through both base portion 84 and metallic portion 85 and which is adapted to accommodate shaft 21. The second arcuate portion 91 occupies a few degrees more than the third quadrant of the circle as viewed ni Fig. 12. There is also provided a third arcuate inner portion 93 which is concentric with, but spaced radially from portion 86 of insulating portion 84, and has a radial length somewhat less than the second arcuate portion 91. The third arcuate portion occupies the fourth quadrant of the circle as viewed in Fig. 12. The first and second arcuate portions are connected at point 94 and the first and third arcuate portions are connected at point 95. The screws 96 serve to electrically connect the metallic portion 85 to the shaft 21.

Arcuate portion 89 constitutes an annular track C; arcuate portion 91 constitutes two annular tracks D and E and arcuate portion 93 constitutes an extension of annular track D.

In operation, the motor 26 will rotate, deriving its power from a suitable source of power (not shown) and will drive code wheel 63 and, through the gearing 38, 39, cam wheel 77. As shown schematically in Fig. 14, the switch 78 will prepare a path for the cathode return circuits of tubes 10 and 11, alternately, under control of the peripheral cam surface notches 87 and 88 of cam wheel 77. Initially, for the 500 kilocycle transmission, notch 87 causes switch 78 to complete the return circuit of tube 10 causing tube 16 to amplify at a frequency of 500 kilocycles. The tongue of switch 78 is electrically connected to contact wiper 84 by means of conductor 97 and the return path to ground will be completed via wipers 81 and 75 through wheel 63 to ground for the transmission on 500 kilocycles of the twelve, four-second, alarm-dashes. At the conclusion of the second revolution of wheel 63, the wheel 77 will have rotated about 180°, with the result that the wiper 81 will then ride on the insulating portion of track C thereby effectively open-circuiting the wiper 75 and the further transmission of alarm dashes. Coincidentally, at the conclusion of the second revolution of wheel 63, wiper 82 makes contact with the metallic portion of track D thereby completing a circuit through wipers 82 and 76 and enabling the "SOS" signals to be transmitted from track B on wheel 63. Upon the start of the fourth revolution of wheel 63, the wiper 83 engages the metallic portion of track E and effectively shunts both wipers 75 and 76 and causes to be perpetuated the long dash theretofore initiated by the wiper 76 contacting the metallic portion 72 of track B. Upon the completion of the fourth revolution of wheel 63, the wheel 77 will have completed a full rotation and the wiper 83 will ride on the insulating portion of track E thereby conditioning the device to reoperate through the same cycle if desired.

Figure 15:
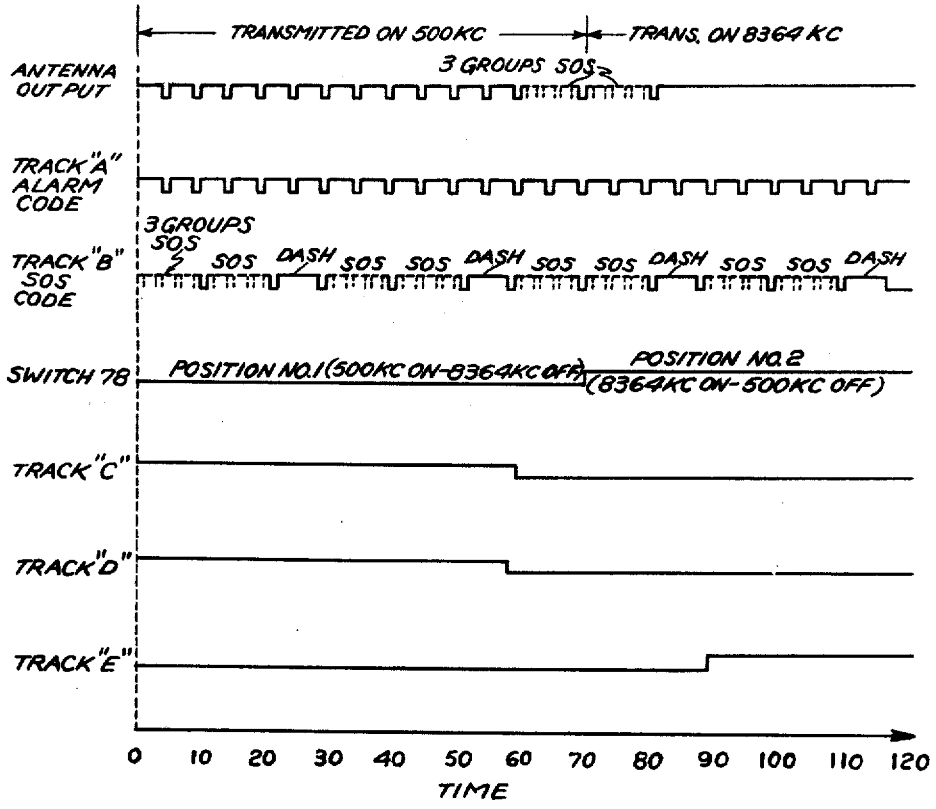
Fig. 15 is a timing chart showing the operation of the various contact wipers and cams of the modified form of my invention.

Fig. 15 will be helpful in understanding the relative timing of the several elements and is self-explanatory.

It will be understood, of course, that the invention is not limited to any particular spacing of length of the alarm contact segments, or of the "SOS" contact segments and that any other combination of coded segments on the wheel 29 or 63 can be employed as conditions may require.

Various changes and modifications may be made in the disclosed embodiment without departing from the spirit and scope of the invention.

What is claimed is:

1. An automatic radio transmitter for recurrently and cyclically transmitting successive coded messages, comprising a plurality of carrier frequency sources, an automatic keying device in the form of a rotary commutator having contact segments arranged in a spiral array, a shiftable switch member, means to operate said member in interlocked timed relation with said commutator to scan said segments successively and cyclically, said member also having an element for connecting the scanned segments in correlated sequence with a selected one of said sources.

2. An automatic radio transmitter for recurrently and cyclically transmitting successive coded messages, comprising a plurality of carrier frequency sources one for each of said messages, a rotary commutator having series of contact segments arranged in spiral array, a dual contact switch, means to operate said switch and commutator in fixed timed relation to cause one contact of the switch to scan said segments while the other contact completes a circuit from the scanned segment to a corresponding one of said sources.

3. An automatic radio transmitter for recurrently and cyclically transmitting successive coded messages on respectively different carrier frequencies, comprising a plurality of carrier frequency sources one for each of said messages, a rotary commutator having a series of contact segments arranged in multi-turn spiral array, one group of segments representing one coded message to be repeated, another group of segments representing the other coded message to be repeated, a dual switch having a pair of stationary contacts and a pair of contacts rotatable as a unit, means for rotating said rotatable contacts to cause one rotatable contact to engage the segments of said one group while simultaneously engaging the other rotatable contact with one of said stationary contacts, and for thereafter causing the said other rotatable contact to engage the segments of the other group while simultaneously causing the said one rotatable contact to engage the other of said stationary contacts.

4. An automatic radio transmitter, comprising a pair of carrier frequency oscillators each including an oscillator tube, a switch for recurrently and successively completing the circuit of each oscillator said switch including a pair of spaced stationary contacts and a pair of movable contacts carried by a rotatable support, a rotary commutator having a series of stationary contact segments arranged in spiral array, motor means to rotate the said rotary element of said commutator and said support in predetermined fixed speed relation whereby one of said movable contacts scans said segments while the other movable contact completes the circuit of a particular one of said oscillators.

5. An automatic radio transmitter according to claim 4 in which the cathode return circuit of one oscillator is connected to one of said stationary contacts and the cathode return circuit of the other oscillator is connected to the other stationary contact, and said movable contacts successive complete a circuit to ground through the segments of said commutator.

6. An automatic radio transmitter according to claim 4 in which the segments of said commutator are arranged in two serially related groups with the segments of one group spaced to represent one coded message and the segments of the other group spaced to represent a different coded message, and said motor means rotates said support to cause one movable contact to scan the first segment group through a plurality of revolutions of said commutator and then to cause the other movable contact to scan the segments of the other group through at least one complete revolution of said commutator.

7. An automatic radio transmitter according to claim 6 in which said rotatable support is mounted with its axis of rotation offset with respect to the axis of rotation of said commutator whereby the movable contacts trace a radial path with respect to said segments.

8. An automatic carrier frequency shift system, comprising a pair of carrier oscillators each of which is to be automatically keyed in accordance with a different respective coded message, means recurrently keying one oscillator with one coded message and for thereafter recurrently keying the other oscillator with the other coded message, the last-mentioned means including a rotatable commutator wheel having commutator segments arranged in successive groups respectively according to said coded messages, and a dual rotatable switch having a pair of diametrically opposite contact brushes mounted for rotation as a unit, one brush engaging one group of segments while the other brush connects a corresponding one of said oscillators in circuit.

9. An automatic carrier frequency shift system according to claim 8 in which said rotatable switch has a pair of spaced stationary contacts each of which is successively engaged by a respective one of said rotatable brushes.

10. An automatic keying device comprising a rotary commutator having a rotary member with a series of commutator segments, some of which are arranged in spiral array, a pair of brushes for scanning said segments said brushes being carried by a separate rotatable device, means to support said device with its axis of rotation offset with respect to the axis of said rotary member, and means to drive said device and said member at fixed different speeds to cause one brush at a time to move radially across said member while the other brush is completing a circuit extending through said segments in succession to a load.

11. An automatic keying device according to claim 10, in which said rotary member has a series of contact segments extending radially on the commutator, and another series of segments spirally arranged on the commutator.

12. An automatic keying device according to claim 11, in which the first-mentioned segments are spaced circumferentially of the commutator according to one side, while the other segments are spaced spirally according to a different code.

13. An automatic keying device according to claim 10, in which said rotatable device is mounted adjacent a pair of stationary contacts each having a cam-like contact surface for lifting one brush at a time out of contact with rotary member during a predetermined extent of angular rotation of said rotary member.

14. In combination with radio transmitting equipment adapted to transmit on two frequencies, an automatic control apparatus for keying said equipment, said apparatus comprising common motive means, a first switch disc coupled to said motive means for rotation thereby, said disc having a plurality of electrically conductive surfaces defining a plurality of keying tracks, first contact means for cooperating with said tracks, a second disc, switch means having two positions of operation, said switch means connected to said equipment to operate same at said frequencies respectively in accordance with its position, said switch means in operative association with said second disc and adapted to be controlled thereby, means for coupling said second disc with said motive means whereby said second disc rotates at a speed different from the speed of rotation of said first disc, said second disc having a plurality of electrically conductive surfaces defining a plurality of control tracks, a plurality of additional contact means for cooperating with said control tracks, means to connect a first of said additional contacts in shunt with said first contact means whereby to cause said equipment to transmit at a first frequency independent of said keying tracks, additional connecting means interconnecting said first contact means with the other of said additional contact means whereby said keying tracks cause recurrent and cyclic transmissions by said equipment of coded messages at different frequencies.

15. Apparatus as claimed in claim 14, wherein said keying tracks comprise a pair of concentric rows of said conductive surfaces.

16. Apparatus as claimed in claim 14, wherein said control tracks comprise a plurality of sectors of electrically conductive material on a first portion of said second disc, said sectors having different radii.

17. Apparatus as claimed in claim 14, wherein said second disc comprises a peripheral cam surface, said cam surface adapted to control positioning of said switch means.

18. Apparatus as claimed in claim 14, further comprising a fixed housing, said housing comprising a pair of spaced plates, said first disc rotatable in the space between said plates and said second disc rotatable outside said housing, said means for coupling said second disc comprising a pinion gear coupled to said motive means and a meshing gear cooperating with said pinion gear, both said gears within said housing, and a rotatable shaft extending through one of said plates interconnecting said second disc and said meshing gear.

19. Apparatus as claimed in claim 18, wherein said first contact means comprises a pair of fixed wipers insulatingly mounted on one of said plates and said additional contact means comprises a plurality of fixed additional wipers insulatingly mounted on the other of said plates.

20. Apparatus as claimed in claim 18 wherein said switch means is mounted on one of said plates in proximity to the periphery of said second disc.

References Cited in the file of this patent

UNITED STATES PATENTS

| | | |
|---|---|---|
| 1,500,785 | Alexanderson | July 8, 1924 |
| 2,389,786 | Kohn | Nov. 27, 1945 |
| 2,459,281 | McDonald | Jan. 18, 1949 |
| 2,500,809 | Fennessy et al. | Mar. 14, 1950 |
| 2,505,781 | Mallinson | May 2, 1950 |
| 2,506,429 | Melick | May 2, 1950 |